United States Patent [19]

Sakoe

[11] Patent Number: 5,410,635
[45] Date of Patent: Apr. 25, 1995

[54] CONNECTED WORD RECOGNITION SYSTEM INCLUDING NEURAL NETWORKS ARRANGED ALONG A SIGNAL TIME AXIS

[75] Inventor: Hiroaki Sakoe, Tokyo, Japan

[73] Assignee: NEC Corporation, Tokyo, Japan

[21] Appl. No.: 291,509

[22] Filed: Aug. 18, 1994

Related U.S. Application Data

[63] Continuation of Ser. No. 927,887, Aug. 11, 1992, abandoned, which is a continuation of Ser. No. 596,613, Oct. 10, 1990, which is a continuation of Ser. No. 275,996, Nov. 25, 1988, abandoned.

[30] Foreign Application Priority Data

Nov. 25, 1987 [JP] Japan .................. 62-298282

[51] Int. Cl.⁶ .................................................. G10L 5/00
[52] U.S. Cl. ........................................................ 395/2.41
[58] Field of Search ................ 395/2, 2.11, 2.41, 2.68, 395/20, 24; 364/487, 807, 824; 307/201; 381/41–43; 382/15

[56] References Cited

U.S. PATENT DOCUMENTS

| | | | |
|---|---|---|---|
| 3,287,649 | 11/1966 | Rosenblatt | 307/201 |
| 4,555,796 | 11/1985 | Sakoe | 381/43 |
| 4,591,980 | 5/1986 | Huberman et al. | 364/200 |
| 4,592,086 | 5/1986 | Watari et al. | 381/43 |
| 4,773,024 | 9/1988 | Faggin et al. | 364/513 |
| 4,802,103 | 1/1989 | Faggin et al. | 364/513 |
| 4,805,225 | 2/1989 | Clark | 382/15 |
| 4,807,168 | 2/1989 | Moopenn et al. | 364/900 |

OTHER PUBLICATIONS

Lippmann, "An Introduction to Computing with Neural Nets", IEEE ASSP Magazine, Apr. 1987, pp. 4–22.

Primary Examiner—David D. Knepper
Attorney, Agent, or Firm—Sughrue, Mion, Zinn, Macpeak & Seas

[57] ABSTRACT

For use in recognizing an input pattern consisting off feature vectors positioned at a first, ..., an i-th, ..., and an I-th pattern time instant along a pattern time axis, a connected word recognition system comprises first through N-th neural networks B(1) to B(N) which are assigned to reference words identified by a first, ..., an n-th, ..., and an N-th word identifier and are arranged along a signal time axis divisible into a first ..., a j-th, ..., and a J-th signal time instant. The n-th word identifier n corresponds to consecutive ones of the pattern time instants by a first function n(i). The time axes are related to each other by a second function j(i). Among various loci (n(i), j(i)) in a space defined by the word identifiers and the time axes, an optimum locus (n̂(i), ĵ(i)) is determined to maximize a summation of output signals of the respective neural networks when the consecutive pattern time instants are varied between the first and the I-th pattern time instants for each word identifier. The input pattern is recognized as a concatenation of word identifiers used as optimum first functions n̂(i) in the optimum locus. Preferably, the optimum locus is determined by a dynamic programming algorithm. If possible, use of a finite-state automaton is more preferred.

15 Claims, 4 Drawing Sheets

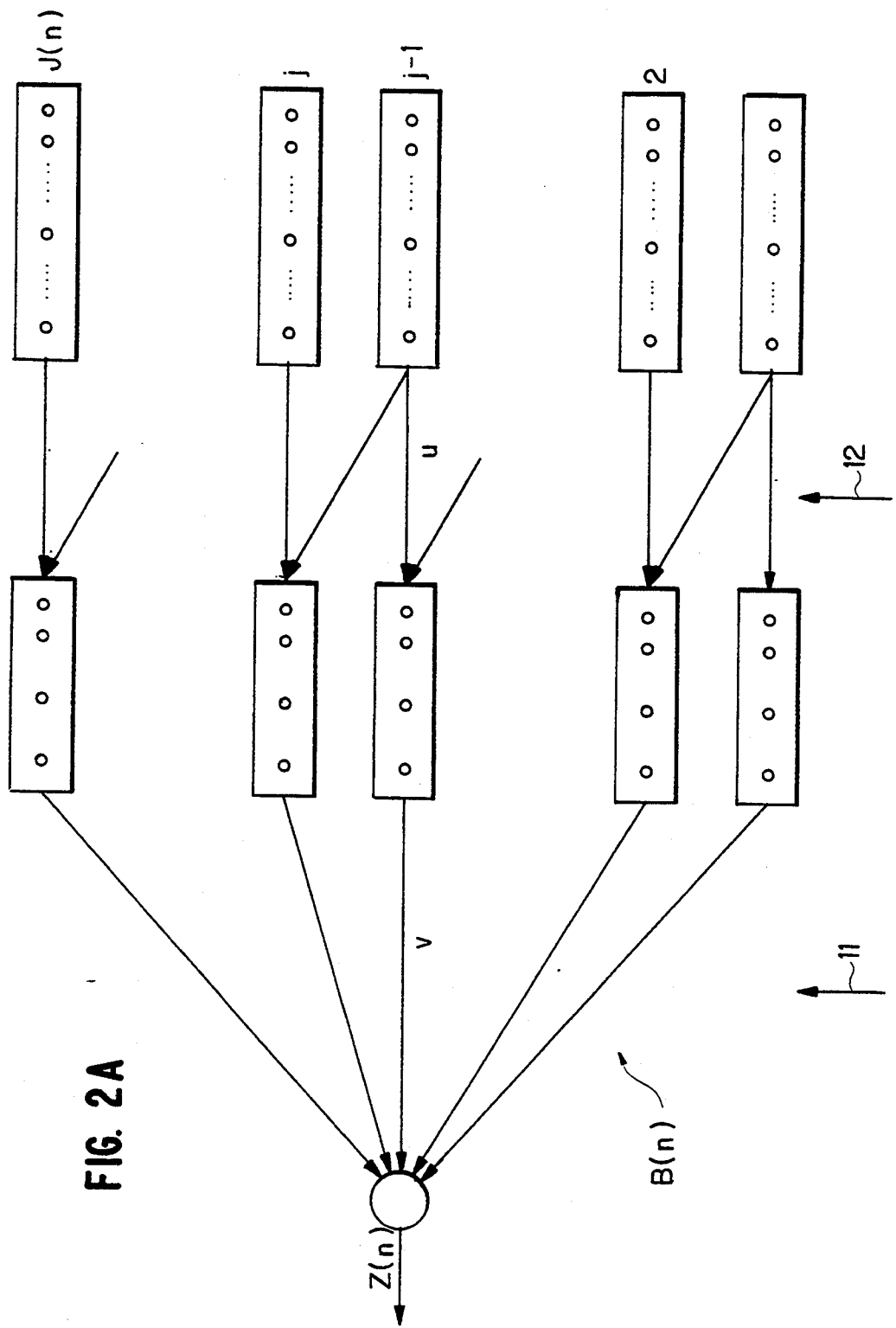

CONNECTED WORD RECOGNITION SYSTEM INCLUDING NEURAL NETWORKS ARRANGED ALONG A SIGNAL TIME AXIS

This is a continuation of application Ser. No. 07/927,887 filed Aug. 11, 1992, abandoned, which is a continuation of application Ser. No. 07/596,613 filed on Oct. 10, 1990, which is a continuation of application Ser. No. 07/275,996 filed Nov. 25, 1988 now abandoned.

BACKGROUND OF THE INVENTION

This invention relates to a connected word recognition system for use in recognizing an input pattern representative of connected words or substantially continuously spoken words by carrying out pattern matching with a concatenation of reference patterns representative of reference words, respectively.

Various connected word recognition systems are already known. Compared with discrete word recognition of recognizing discretely spoken words, connected word recognition is carried out at a much higher speed and is therefore very effective in supplying control commands to a controlling system and in supplying instructions and input data to an electronic digital computer system. Among the connected word recognition systems, a most excellent one is believed to be that disclosed in U.S. Pat. No. 4,592,086 issued to Masaru Watari and Hiroaki Sakoe, assignors to Nippon Electric Co.. Ltd., the present assignee. According to the Watari et al patent, connected word recognition is carried out in compliance with a clockwise dynamic programming (DP) algorithm as called in the art at present.

For such a connected word recognition system, first through N-th reference patterns are preliminarily selected, where represents a first predetermined natural number. The reference patterns include an n-th reference pattern, where n is variable between 1 or unity and the first predetermined natural number N, both inclusive. It is possible to understand that the letter n serves as an n-th word identifier indicative of an n-th reference word represented by the n-th reference pattern and that the first through the N-th reference patterns are arranged at first through N-th consecutive word identifier points along a word identifier axis which may be denoted by the letter n.

The input pattern is represented by an input pattern time sequence which may alternatively be referred to simply as a pattern time sequence and consists of feature vectors positioned along a pattern time axis at first through I-th pattern time instants, respectively, where I represents a second predetermined natural number. The pattern time instants are spaced apart by a pattern time interval or period and include an i-th pattern time instant at which an i-th feature vector is positioned, where i is variable between 1 and the second predetermined natural number, both inclusive. The pattern time axis may be designated by the letter i.

Each reference pattern is represented by a reference pattern time sequence which may be simply called a reference time sequence and consists of reference vectors positioned at reference time instants, respectively. The reference time instants are spaced apart by a reference time interval which may or may not be equal to the pattern time interval.

The concatenation of reference patterns is formed with repetition of one or more of the reference patterns allowed and is selected as a result of recognition of the input pattern in the manner which will presently be described. The concatenation has a concatenation time axis which may alternatively be called a signal time axis for convenience of description of the present invention and is divided into first through J-th signal time instants, where J represents a third predetermined natural number. The signal time instants include a j-th signal time instant which is one of the reference time instants and at which a j-th reference vector of one of the reference patterns is positioned, where j is variable between 1 and the third predetermined natural number J, both inclusive. The signal time axis may be represented by the letter j.

On recognizing the input pattern, a mapping or warping function is used in mapping the pattern and the signal time axes to each other. The mapping function may be:

$$j = j(i),$$

which defines for the i-th pattern time instant one of a predetermined number of consecutive ones of the first through the J-th signal time instants. Furthermore, a similarity measure is used to represent either a similarity or a dissimilarity between the input pattern and the concatenation of reference patterns. For example, an elementary distance is calculated between the feature vector positioned at the i-th pattern time instant and the reference vector positioned at one of the signal time instants that is mapped to the i-th pattern time instant. Such elementary distances are summed up into a pattern distance as regards the first through the I-th pattern time instants to describe a dissimilarity between the input pattern and the concatenation of reference patterns.

In connection with the pattern distance, it should be noted that the reference patterns are selected so that the reference words may cover the connected words which should be recognized. The n-th refernece pattern is therefore either related or unrelated to a portion of the input pattern by a first function n(i) defined by a plurality of consecutive ones of the first through the I-th pattern time instants. The mapping function may be called a second function j(i).

It is possible to represent the elementary distance by a formula d(n, i, j) assuming that the i-th pattern time instant is mapped by a certain second function j(i) to the j-th signal time instant at which the n-th reference pattern has the j-th signal vector of a certain concatenation of reference patterns. According to the clockwise dynamic programming algorithm, pattern distances are calculated along various loci (n(i), j(i)) in a three-dimensional space (n, i, j) which is defined by the word identifier axis n or the first through the N-th word identifiers and the pattern and the signal time axes i and j.

Each locus starts at a starting point (n(s), 1, 1) in the space, namely, at a starting reference pattern n(s) and the first pattern and signal time instants, and ends at an end point (n(e), I, J), namely, at an end reference pattern n(e) and the i-th pattern and the J-th signal time instants through pertinent ones of the first through the N-th reference patterns, through the first to the I-th pattern time instants, and through those of the first to the J-th signal time instants to which the first through the I-th pattern time instants are mapped in compliance with the second function j(i). The start and the end reference patterns are included in the first through the N-th reference patterns and may be either different from each other or identical with each other.

An optimum locus $(\hat{n}(i), \hat{j}(i))$ is selected so as to provide a minimum distance among the pattern distances calculated along the respective loci by solving a minimization problem:

$$\min_{n(i), j(i)} \left[ \sum_{i=1}^{I} d(n, i, j) \right], \quad (1)$$

with the first and the second functions n(i) and j(i) varied. That is, the minimization problem is solved to determine a concatenation of optimum ones $\hat{n}(i)$ of the first functions. Although simultaneously determined, an optimum second function $\hat{j}(i)$ is unnecessary in obtaining the result of recognition.

Attention should be directed in connection with the clockwise dynamic programming algorithm to the fact that each reference pattern is represented by a mere reference pattern time sequence. As a consequence, it has been insufficient with the clockwise dynamic programming algorithm to cope with a wide variation in the input pattern representative of predetermined connected words, such as personal differences of articulation or pronunciation and temporary devocalization of voiced vowels. In other words, conventional connected word recognition systems are defective in recognizing connected words with a high precision or reliability.

On the other hand, a multi-layer neural network or net is revealed by Hiroaki Sakoe, the present inventor, in United States patent application Ser. No. 263,208, which was filed on Oct. 27, 1988 (hereinafter referred to as "prior patent application"), which is now U.S. Pat. No. 4,975,961, and with reference to an article contributed by Richard P. Lippmann to the IEEE ASSP Magazine, April 1987, under the title of "An Introduction to Computing with Neural Nets". The multi-layer neural network will hereinafter be referred to simply as a neural network and includes input neuron units of an input layer, intermediate neuron units of an intermediate layer, and at least one output neuron unit of an output layer. The neural network serves to recognize an input pattern of the type described above.

When a single output neuron unit alone is included, the neural network is used in recognizing whether or not the input pattern represents a particular reference pattern assigned to the single output neuron unit. When first through N-th output neuron units are included, they are assigned to the first through the N-th reference patterns of the above-described type. The neural network is used in recognizing the input pattern as one of the reference patterns.

According to the prior patent application, the input and the intermediate neuron units are arranged and interconnected as a time sequential structure having a signal time axis which is divided into first through J-th signal time instants, where J may be called the third predetermined natural number as above. The pattern and the signal time axes are related to each other by a mapping function of the type described above. In the manner described before, the i-th pattern time instant is related to one of a predetermined number of consecutive ones of the first through the J-th signal time instants. Alternatively, the j-th signal time instant is related to one of a predetermined number of consecutive ones of the first through the I-th pattern time instants. In either event, the input pattern time sequence is supplied to the input neuron units according to the mapping function.

The time sequential structure makes it readily possible to put the neural network into operation according to the dynamic programing algorithm or technique known in the art of pattern matching. The neural network is therefore named a dynamic neural network in the prior patent application. It is possible to train the dynamic neural network according to the back-propagation training algorithm described in the above-mentioned Lippmann article. It has, however, been not known to make the dynamic neural network represent various concatenations of reference patterns.

SUMMARY OF THE INVENTION

It is therefore an object of the present invention to provide a connected word recognition system which includes a neural network of the type revealed in the above-referenced prior patent application and is capable of dealing with various concatenations of reference patterns.

It is another object of this invention to provide a connected word recognition system of the type described, which is capable of coping with a wide variation in substantially continuously spoken words and of recognizing such connected words with a high reliability.

Other objects of this invention will become clear as the description proceeds.

According to this invention, there is provided a speech recognition system for recognizing, as a concatenation of selected ones of first through N-th reference words, an input pattern representing connected words. The input pattern has a pattern time axis defining a plurality (e.g. first through I-th) pattern time instants. The variable N represents a predetermined natural number, and I represents a positive integer dependent on the input pattern.

The speech recognition system comprises a plurality (e.g. first through N-th) of neural networks representing the first through N-th reference words and having a plurality (e.g. first through N-th) of reference time axes, respectively. Each of the neural networks comprises a plurality of input neuron units, grouped into a plurality of input frames, a plurality of intermediate neuron units, grouped into a plurality of intermediate frames, and an output neuron unit connected to the intermediate neuron units of the intermediate frames. Each of the intermediate neuron units are connected to the input neuron units of at least one of the input frames, with some of the intermediate neuron units being connected to two consecutive input frames.

A supply device of the speech recognition system supplies the input pattern to the input neuron units of the first through N-th neural networks in compliance with a mapping function. The mapping function maps each of the first through N-th reference time axes and the pattern time axis onto each other to make the first through N-th neural networks produce first through N-th output signals, respectively. The first through N-th output signals depend on the mapping function and on a plurality of relation functions, each of which relates each of the first through N-th reference words to a portion defined in the input pattern by a plurality of consecutive ones of the pattern time instants.

The speech recognition system further comprises a device for determining the selected reference words based on optimum relation functions that maximize summations of the first through N-th output signals.

BRIEF DESCRIPTION OF THE DRAWING

FIG. 2A is a schematic representation of a dynamic neural network used in the connected word recognition system depicted in FIG. 1;

DESCRIPTION OF THE PREFERRED EMBODIMENTS

Figure 1:
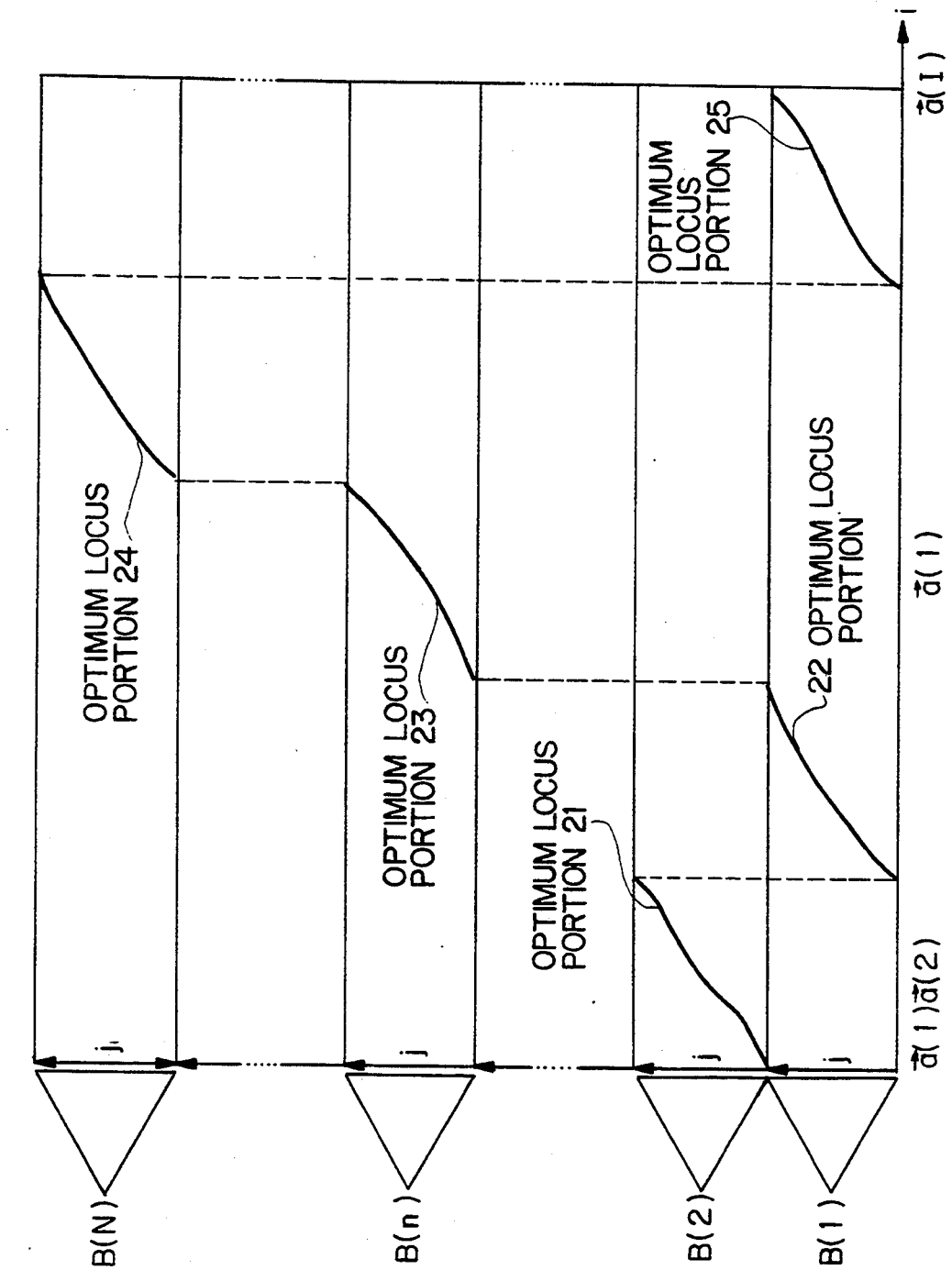
FIG. 1 schematically shows a connected word recognition system according to a basic embodiment of the instant invention and a diagram for use in describing operation of the connected word recognition system.

Referring to FIG. 1, a connected word recognition system comprises first through N-th neural networks or nets B(1), B(2), ..., and B(N) according to a basic embodiment of the present invention, where N represents a first predetermined natural number which will later be exemplified. The neural networks include an n-th neural network B(n), where n is variable between 1 or unity and the first predetermined natural number N, both inclusive. Each neural network is a dynamic neural network of the type revealed in the prior patent application referenced heretobefore.

The first through the N-th neural networks are assigned to first through N-th reference patterns B(1) to B(N), respectively, which are denoted by the reference symbols of the first through the N-th neural networks merely for simplicity of denotation. The first through the N-th reference patterns are representative of first through N-th reference words (1) to (N), respectively, in the manner which will presently be described.

The symbol n or (n) therefore serves as an n-th word identifier indicative of an n-th reference word (n) assigned to the n-th neural network B(n). It is possible to understand that the first through the N-th word identifiers are consecutively arranged along a word identifier axis which may be designated by the letter n.

The first through the N-th neural networks B(1) to B(N) are supplied with an input pattern A which generally represents connected words or substantially continuously spoken words. In a specific case, the input pattern represents a single word. Each word may be a dictionary word, a part of the dictionary word, or a succession of dictionary words. Furthermore, each word may be a syllable which consists of at least one consonant, a vowel, and at least one consonant. Therefore, the connected word recognition system may alternatively be called a speech recognition system.

The input pattern A is represented by a pattern time sequence of first through I-th feature vectors $\vec{a}(1)$, $\vec{a}(2)$, ..., and $\vec{a}(I)$, where I represents a second predetermined natural number which is dependent on the length or duration of the input pattern being dealt with. The feature vectors include an i-th feature vector $\vec{a}(i)$, where i is variable between 1 and the second predetermined natural number E, both inclusive. The first through the I-th feature vectors are positioned along a pattern time axis i at first through I-th pattern time instants, respectively, which include an i-th pattern time instant and are spaced apart by a pattern time interval or period known in the art of speech recognition.

The n-th reference pattern B(n) is represented by an n-th reference time sequence of first through J(n)-th reference vectors $\vec{b}(n, 1)$, $\vec{b}(n, 2)$, ..., $\vec{b}(n, j)$, ..., and $\vec{b}(n, J(n))$, where J(n) represents a natural number representative of an n-th reference pattern length of the n-th reference pattern. The reference vectors are positioned along an n-th reference time axis at first through J(n)-th reference time instants spaced apart by a reference time interval which is common to the first through the N-th reference patterns without loss of generality and may or may not be equal to the pattern time interval.

Simple examples of the connected words are a spoken combination of three letters, such as "TYO", used as a control command for a controlling system and a spoken succession of one-digit numerals used as an input datum of an electronic digital computer system. The input datum may consist of as many as fifty one-digit numerals.

On recognizing only the spoken one-digit numeral or numerals, the first predetermined natural number N may be equal to ten. On recognizing the spoken combination or combinations of three alphabets, the first predetermined natural number may be equal to twenty-six. Even in either event, it is preferred that the first predetermined natural number should be as great as one hundred. On recognizing connected words by phonemes, the first predetermined natural number may be equal to about two hundred. About five hundred neural networks may be used on recognizing substantially continuously spoken words by a vocabulary of dictionary words.

In the known manner, each of the feature and the reference vectors is a K-dimensional vector consisting of first, second, ..., k-th, ..., and K-th vector components, where K represents a first predetermined integer which is typically equal to sixteen. Incidentally, the natural number J(n) may be equal to about one hundred irrespective of the word identifier n, namely, for each of the first through the N-th neural networks, when the reference time interval is about ten milliseconds long.

Turning to FIG. 2A for a short while, the n-th neural network B(n) comprises an input layer, an intermediate layer, and an output layer which are illustrated rightwardly, centrally, and leftwardly of the figure, respectively. The input layer comprises a plurality of input neuron units. The intermediate 15 layer consists of a plurality of intermediate neuron units which may be greater in number in a conventional multi-layer neural network than the input neuron units. Each of the input and the intermediate neuron units is symbolically illustrated by a small circle. In the example being illustrated, the output layer consists of only one output neuron unit shown by a greater circle.

In the manner described in the prior patent application cited heretobefore, the input neuron units of the n-th neural network B(n) are grouped into first, second, ..., j-th, ..., and J(n)-th input frames. The intermediate neuron units are grouped into first, second, ..., j-th, ..., and J(n)-th intermediate frames. Each of the input and the intermediate frames is depicted by a rectangle. Each input frame of the first through the N-th neural networks consists of first, second, ..., k-th ..., and K-th input neuron units. Each intermediate frame of the neural networks consists of first, second, ..., w-th, ..., and W-th intermediate neuron units, where W represent a second predetermined integer which is typically equal to four.

As regards the n-th neural network B(n), it is possible to understand that an input neuron unit is a k-th row j-th column or frame neuron unit (n, j, k). An intermediate neuron unit is a w-th row j-th column neuron unit (n, j, w). The input neuron units of the j-th input frame will be denoted by "input neuron units (n, j)". The intermediate neuron units of the j-th intermediate frame will be designated by "intermediate neuron units (n, j)".

The input neuron units are not connected to one another in marked contrast to like input neuron units of the conventional multi-layer neural network. Nor are the intermediate neuron units connected to one another. Instead, as shown in detail in FIG. 2B, the intermediate neuron unit (n, j, w) is connected to the input neuron units (n, j′) by input-to-intermediate connections, where j′ represents at least two consecutive integers which are equal to j and less than j. It will readily be understood that the intermediate neuron unit (n, j, w) is not connected to the input neuron units (n, j′) when one or more of the at least two consecutive integers are equal to either zero or to a negative integer, namely, are none of positive integers. This manner of division of the input and the intermediate neuron units of each neural network into frames and connection of the input neuron units to the intermediate neuron units is called a time sequential structure.

In the illustrated example, only two consecutive integers are used as the at least two consecutive integers. More specifically, the intermediate neuron unit (n, j, w) is connected to the input neuron units (n, j) and (n, j−1). By intermediate-to-output connections, the output neuron unit is connected to the intermediate neuron units of the intermediate layer. The input-to-intermediate and the intermediate-to-output connections are symbolically depicted by lines drawn from the (j−1)-th and the j-th input frames to the j-th intermediate frame and from the intermediate frames of the intermediate layer to the output neuron unit merely for simplicity of illustration.

An intermediate weighting coefficient or factor u(n, j, k, w, 0) is attributed to the input-to-intermediate connection which connects the input neuron unit (n, j, k) to the intermediate neuron unit (n, j, w). Another intermediate weighting coefficient u(n, j, k, w, 1) is attributed to the input-to-intermediate connection 15 between the input neuron unit (n, j−1, k) and the intermediate neuron unit (n, j, w). An output weighting coefficient v(n, j, w) is attributed to the intermediate-to-output connection between the intermediate neuron unit (n, j, w) and the output neuron unit.

It is possible to train the n-th neural network B(n) according to the back-propagation training algorithm described in the Lippmann article mentioned heretobefore. In other words, the neural network comprises first and second adjusting arrangements which are symbolically illustrated by arrows 11 and 12 drawn below the intermediate-to-output and the input-to-intermediate connections as shown in FIG. 2A. In accordance with the back-propagation training algorithm, the first adjusting arrangement 11 adjusts the output weighting coefficients v (arguments omitted). The second adjusting arrangement 12 adjusts the intermediate weighting coefficients u (arguments omitted).

Turning back to FIG. 1, the first through the N-th neural networks B(1) to B(N) are successively arranged along a signal time axis j which is a concatenation of the first through the N-th reference time axes and are therefore divisible into first through J-th signal time instants, where J represents a third predetermined natural number. The first through the J-th signal time instants are in one-to-one correspondence to the reference time instants of the first through the N-th reference patterns. For the time being, it will be presumed in connection with the signal time instants that the J(n−1)-th reference time instant of the (n−1)-th reference pattern B(n−1) is spaced apart from the first reference time instant of the n-th reference pattern B(n) by the reference time interval.

In the manner described in the prior patent application, a mapping or warping function is used to map the pattern and the signal time axes i and j to each other on supplying the input pattern A to the first through the N-th neural networks B(1) to B(N). The mapping function may be:

$$j = j(i), \qquad (2)$$

which maps the pattern time axis i to the signal time axis j by mapping the input pattern A to a signal pattern X represented by a signal time sequence of first through J-th signal vectors $\vec{x}(1)$ to $\vec{x}(J)$ which are positioned at the first through the J-th signal time instants and include a j-th signal vector $\vec{x}(j)$ positioned at the j-th signal time instant. Each signal vector consists of first through K-th vector components.

In the manner described in the prior patent application, the first through the K-th vector components of the j-th signal vector $\vec{x}(j)$ are supplied to the input neuron units (n, j), namely, to the input neuron units (n, j, 1) through (n, j, K), respectively, as input layer input components. Similarly, the vector components of the (j−1)-th signal vector $\vec{x}(j−1)$ are supplied to the input neuron units (n, j−1) as other input layer input components. On so supplying the signal vectors to the input frames, the word identifier n is selected in the manner which will become clear as the description proceeds.

According to Equation (2), the mapping function defines, for the i-th pattern time instant, one of a predetermined number of consecutive ones of the first through the J-th signal time instants. The predetermined number is typically equal to three, In this case, the i-th pattern time instant t is mapped to one of three consecutive signal time instants, for example, the j-th, the (j−1)-th, and the (j−2)-th signal time instants j, (j−1), and (j−2).

It will be assumed merely for simplicity of description that the i-th and the (i−1)-th feature vectors are mapped to the j-th and the (j−1)-th signal vectors by the mapping function under consideration. Each input neuron unit forwardly delivers or conveys the input layer input component thereof, as it stands, to the intermediate neuron units which are connected to the input neuron unit in question. When differently viewed, the intermediate neuron unit (n, j, w) is supplied with the vector components of the i-th feature vectored $\vec{a}(i)$ from the input neuron units (n, j) and with the vector components of the (i−1)-th feature vector $\vec{a}(i−1)$ from the input neuron units (n, j−1) as intermediate input components.

Figure 2B:
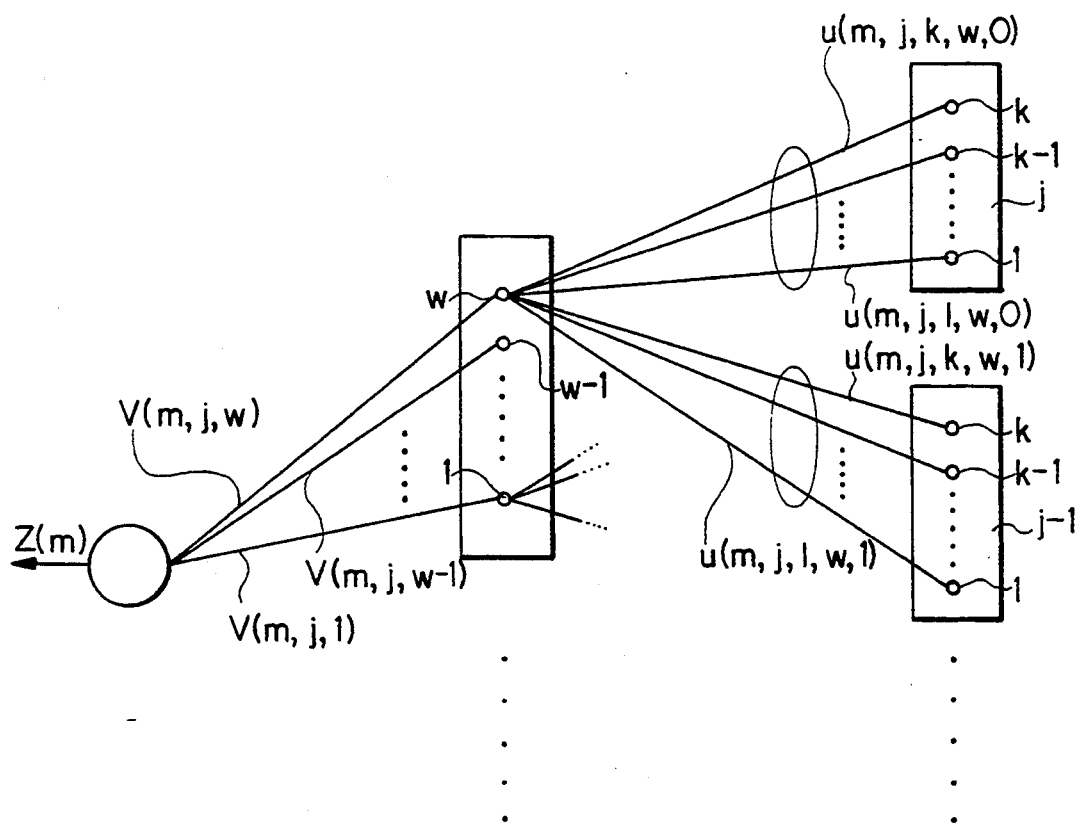
FIG. 2B is a schematic representation of connections between the neuron units of the dynamic neural network shown in FIG. 2A.

It is possible to understand from FIGS. 2A and 2B that the intermediate neuron unit (n, j, w) has the intermediate weighting coefficients u(n, j, k, w, 0) and u(n, j, k, w, 1) and like intermediate weighting coefficients which should be multiplied on the intermediate input components supplied from the input neuron units (n, j, k) and (n, j−1, k) and from other input neuron units of the j-th and the (j−1)-th input frames. The intermediate neuron unit in question calculates an intermediate weighted sum of the intermediate input components weighted by the intermediate weighting coefficients u for the respective intermediate input components and subsequently nonlinearly transforms the intermediate weighted sum into an intermediate output component y(n, j, w). When denoted by net(n, j, w), the intermediate weighted sum is given by:

$$net(n, j, w) = \sum_{k=1}^{K} u(n, j, k, w, 0)a(k, i) +$$

$$\sum_{k=1}^{K} u(n, j, k, w, 1)a(k, i-1),$$

where a(k, i) represents the k-th vector component of the i-th feature vector $\vec{a}(i)$ and a(k, i−1) represents the k-th vector component of the (i−1)-th feature vector $\vec{a}(i−1)$. When a scalar product of two vectors is denoted by a dot:

$$net(n, j, w) = \vec{u}(n, j, w, 0) \cdot \vec{a}(i) = \vec{u}(n, j, w, 1) \cdot \vec{a}(i-1), \quad (3)$$

where each of $\vec{u}$(n, j, w, O) and $\vec{u}$(n, j, w, 1) represents an intermediate weighting vector consisting of vector components, K in number.

The intermediate output component is given by:

$$y(n, j, w) = f(net(n, j, w)), \quad (4)$$

where the letter f represents a sigmoid function described in the Lippmann article. The sigmoid function for the intermediate neuron unit (n, j, w) may be:

$$1/(1+exp(-net(n, j, w) - \Theta(n, j, w))),$$

where $\Theta$(n, j, w) represents an intermediate layer threshold value which is specific to the intermediate neuron unit under consideration. The intermediate output components of the j-th intermediate neuron units (n, j) are vector components, W in number, of a j-th intermediate output vector defined by:

$$\vec{y}(n, j) = (y(n, j, 1), \ldots, y(n, j, w)).$$

The output neuron unit of the n-th neural network B(n) is supplied with the intermediate output component y(n, j, w) from the intermediate neuron unit (n, j, w) and like intermediate output components from other intermediate neuron units of the n-th neural network as output layer input components. It is possible to understand that the output neuron unit has the output weighting coefficients v(n, j, w) and similar output weighting coefficients which should be multiplied on the output layer input components supplied from the intermediate neuron unit (n, j, w) and the other intermediate neuron units. The output neuron unit calculates an output weighted sum of the intermediate output components of the intermediate neuron units of the intermediate layer by weighting the intermediate output components by the respective output weighting coefficients v and then nonlinearly transforms the output weighted sum into an n-th output signal z(n) according to a sigmoid function which is specific to the output neuron unit.

A symbol Net(n, j) will be used to represent a j-th output weighted sum portion, namely, a portion of the output weighted sum, calculated by the output neuron unit of the n-th neural network B(n) in connection with those of the output layer input components which are supplied from the intermediate neuron units (n, j). The output weighted sum portion is given by:

$$Net(n, j) = \vec{v}(n, j) \cdot \vec{y}(n, j), \quad (5)$$

where $\vec{v}$ (arguments omitted) represents a j-th output weighting vector which has vector components, W in number, and is defined by:

$$\vec{v}(n, j) = (v(n, j, 1), \ldots, v(n, j, W)).$$

It is possible by using Equations (3) and (4) to rewrite Equation (5) as follows, $$Net(n, j) = \vec{v}(n, j) \cdot \vec{f}(n, j, i), \quad (5')$$

where the symbol $\vec{f}$ (arguments omitted) represents the j-th intermediate output vector by using the sigmoid functions f (arguments omitted) of the respective intermediate neuron units of the n-th neural network. On so using the j-th intermediate output vector in Equation (5'), it is possible to neglect the intermediate layer threshold values $\Theta$ (arguments omitted) which are specific to the respective intermediate neuron units. This is because each of the sigmoid functions of the intermediate neuron units is a monotonously increasing function. The j-th intermediate output vector is therefore defined by first through W-th vector components as follows:

$$\vec{f}(n, j, i) = (f(\vec{u}(n, j, 1, 0) \cdot \vec{a}(i) + f(\vec{u}(n, j, 1, 1) \cdot \vec{a}(i-1)),$$

$$\ldots ,$$

$$f(\vec{u}(n, j, W, 0) \cdot \vec{a}(i) + f(\vec{u}(n, j, W, 1) \cdot \vec{a}(i-1))).$$

It is clear from Equation (5') that the j-th output weighted sum portion is a function of the word identifier n and the pattern and the signal time instants i and j which are used as independent variables. When the right-hand side of Equation (5') is represented by a dependent variable r(n, i, j) of the independent variables n, i, and j, namely:

$$r(n, i, j) = \vec{v}(n, j) \cdot \vec{f}(n, j, i), \quad (6)$$

the n-th output signal becomes:

$$z(n) = \sum_{i=1}^{I} r(n, i, j), \quad (7)$$

by neglecting the sigmoid function of the output neuron unit because the sigmoid function monotonously increases as above.

In this manner, the n-th output signal z(n) depends on a summation of the dependent variables, such as r(n, i, j), which are calculated by the output neuron unit of the n-th neural network B(n) in connection with the intermediate output vectors supplied from the first through the J(n)-th intermediate frames. It is now unexpectedly understood that the right-hand side of Equation (7) represents a similarity measure which is calculated between the n-th reference pattern B(n) anti a certain portion of the input pattern A and is equivalent to the pattern distance used in the minimization problem of Formula (1) and that the clockwise dynamic programming algorithm is applicable to the connected word recognition system of the structure thus far described with reference to FIGS. 1 and 2.

On resorting to the clockwise dynamic programming algorithm, it should be noted that the first through the N-th reference words (1) to (N) are preliminarily selected to cover various connected words which should be recognized by the connected word recognition system. The n-th reference word (n) is therefore either related or unrelated to a certain portion of the input pattern A by a first function n(i) defined by a plurality of consecutive ones of the first through the I-th pattern time instants. For each of the first through the N-th reference patterns, the mapping function will be called a second function j(i).

Attention is now directed to a three-dimensional space (n, i, j) defined by three axes of the word identifiers 1 to N, namely, the word identifier axis n, and the pattern and the signal time axes i and j. A total summation of the first through the N-th output signals z(1) to z(N) is calculated alone various loci (n(i), j(i)) in the space. An optimum locus (n̂(i), ĵ(i)) is determined to maximize the total summation by varying the above-mentioned plurality of pattern time instants through the first to the I-th pattern time instants to vary the first and the second functions n(i) and j(i) so that the second function j(i) relates the pattern and the signal time axes for each of the first through the N-th reference words (1) to (N). Both the first and the I-th pattern time instants are used during variation of the word identifier n between 1 and the first predetermined natural number N.

A result of recognition of the input pattern A is given by optimum first functions n̂(i) of the optimum locus. The optimum first functions are indicative of optimum word identifiers n̂. On getting an optimum concatenation of word identifiers n̂, optimum second functions ĵ(i) are unnecessary. Nor are necessary the pattern time instants for the optimum functions n̂(i) and ĵ(i).

In the example illustrated in FIG. 1, the optimum locus (n̂(i), ĵ(i)) consists of first through fifth locus portions 21, 22, 23, 24, and 25 in the three-dimensional space (n, i, j). It is possible in FIG. 1 to understand that the word identifier axis n is coincident with the signal time axis j and is differently scaled.

The first locus portion 21 starts at a first start point defined by the second word identifier (2), the first pattern time instant, and the first signal time instant and ends at a first end point defined by the second word identifier (2), a certain pattern time instant, and the J(2)-th reference time instant of the second reference pattern B(2). The pattern time instant need not be known. The first start point serves as an overall start point of the optimum locus. The second locus portion 22 starts at a second start point defined by the first word identifier (1) and the pattern and the signal time instants which are equal to one plus the pattern time instant of the first end point and the first reference time instant of the first reference pattern B(1). In this manner, the fifth locus portion 25 ends at a fifth end point which is defined by the first word identifier (1) and the I-th pattern and the J-th signal time instants and serves as an overall end point of the optimum locus.

In the manner obvious from the example, some of the first through the N-th reference words (1) to (N) may not appear in the connected words represented by the input pattern A being dealt with. Substantially zero output signals are produced by the output neuron units of the neural networks assigned to the reference words which do not appear in the result of recognition. Such output signals therefore have substantially no contribution to the total summation. Incidentally, it is possible to understand that the connected word recognition system includes a determining arrangement which is for determining the optimum locus (n̂(i), ĵ(i)) and is exemplified in the drawing figure by the first through the fifth locus portions 21 to 25.

In the manner described in the prior patent application, the mapping function may be:

$$i = i(j), \qquad (8)$$

which defines, for the j-th signal time instant, one of a predetermined number of consecutive ones of the first through the I-th pattern time instants. The mapping function has an inverse function which is identical with Equation (2) when expressed by an equation and relates the first through the J-th signal time instants to certain ones of the first through the I-th pattern time instants with repetition of one or more of the pattern time instants allowed. It is possible to use the inverse function as the second function j(i) for each word identifier on determining the optimum locus.

The predetermined number for Equation (8) is typically equal to three. In this event, the j-th signal time instant is mapped by Equation (8) to one of three consecutive ones of the first through the I-th pattern time instants, such as the i-th, the (i−1)-th, and the (i−2)-th pattern time instants i, (i−1), and (i−2).

In U.S. Pat. No. 4,555,796 issued to Hiroaki Sakoe, the present inventor, a finite-state automaton is used in the connected word recognition system revealed in the Watari et al patent referred to hereinabove. It is possible in this manner to apply a finite-state automaton to the connected word recognition system so far described. The finite-state automaton is for restricting the optimum concatenation of word identifiers n̂ or of reference words (n̂) according to the regular grammar known in the art. In other words, the finite-state automaton controls the first function n(i) on determining the optimum locus (n̂(i), ĵ(i)).

Figure 3:
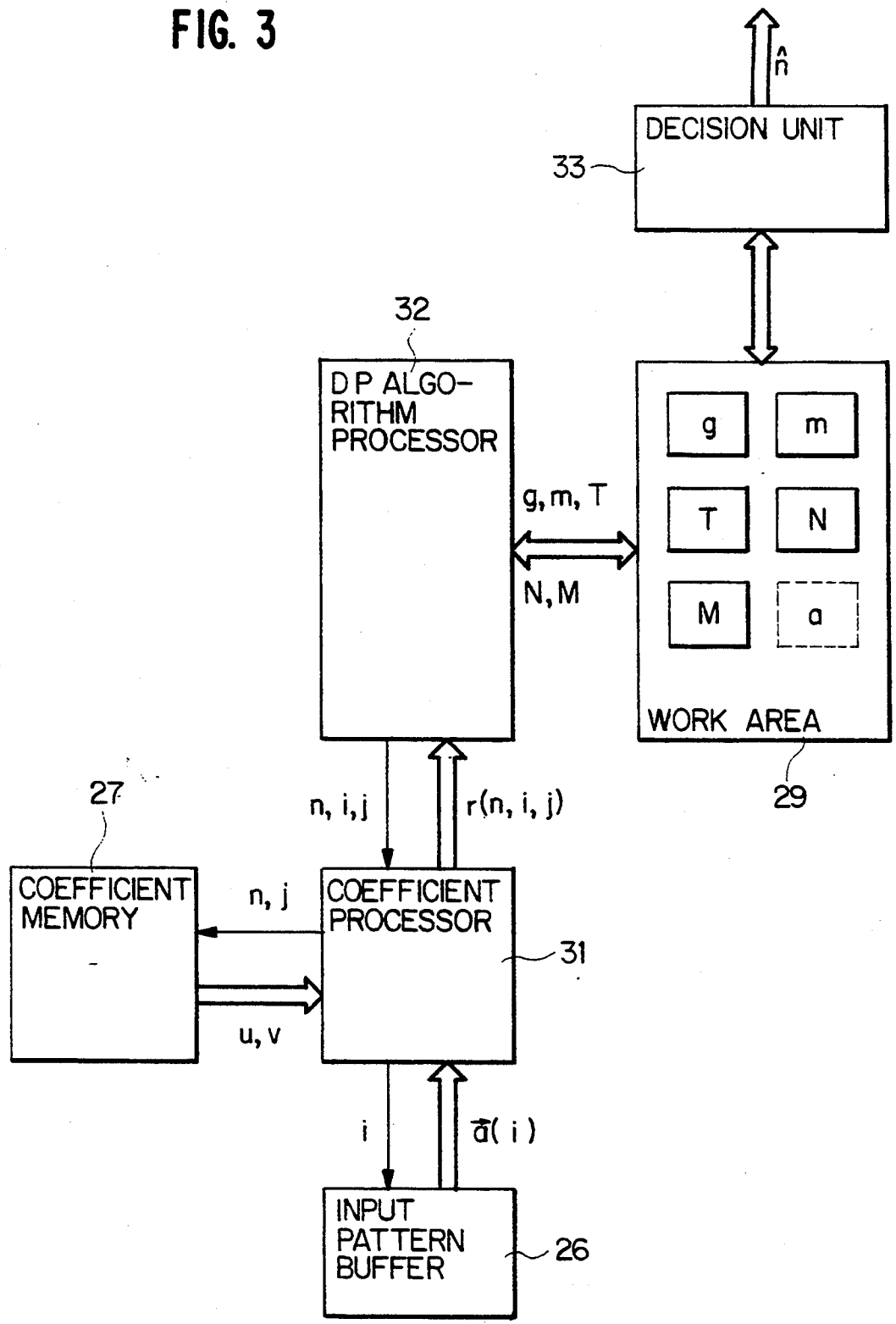
FIG. 3 is a block diagram of a connected word recognition system according to a practical embodiment of this invention.

Referring now to FIG. 3, a connected word recognition system is implemented primarily by a microprocessor according to a practical embodiment of this invention. In the manner described in the prior patent application, it will be surmised in the following that memories are not included in the microprocessor.

An input pattern buffer 26 is for memorizing the feature vectors of the input pattern A along the pattern time axis i. A coefficient memory 27 is a random access memory (RAM) for memorizing the intermediate and the output weighting coefficients u and v of the first through the N-th neural networks B(1) to B(N) described in conjunction with FIG. 1. A work area 29 comprises five table memories, namely, a "g" table g(n, i, j), an "m" table m(n, i, j), a T table T(i), an M table M(i), and an N table N(i). These five tables are accessed either by the pattern time instant i alone or a combination of the word identifier n and the pattern and the signal time instants i and j. It is sufficient that each of the five tables has about one hundred different memory locations for the pattern time instant i.

The microprocessor comprises a first part which serves as a coefficient processor 31 and is connected to the input pattern buffer 26 and the coefficient memory 27. A second part is operable as a dynamic programming algorithm processor 32 and is connected to the work area 29 and the coefficient processor 31. A third part is used as a decision unit 33 and connected to the work area 29 and a utilization device (not shown) which may be either a controlling system or an electronic digital computer system.

In operation, the dynamic programming algorithm processor 32 sets a primary initial condition in each of the T and the "g" tables. More particularly, a zero address T(O) is assumed in the T table. The zero address is loaded with a content which is equal to zero. At each of addresses g(n, 0, j), the "g" table is loaded with a sufficiently small content which is usually called minus infinity in the art.

Subsequently, the dynamic programming algorithm processor 32 carries out a dynamic programming algorithm in the manner which will be described in the following. A pattern time signal is produced to indicate the pattern time instant i from the first pattern time instant in an ascending order of increasing one by one up to a pattern time instant which is necessary to start progress of the dynamic programming algorithm. A word identifier signal represents 1 through the first predetermined natural number N as the word identifier n in the ascending order during a time interval in which the pattern time signal indicates each pattern time instant. A reference time signal indicates the reference time instant j from 1 up to the natural number J(n) in the ascending order during a time period in which the word identifier signal represents each word identifier. It should be noted in connection with the reference time signal that the reference time instant is used instead of the signal time instant and that the predetermined natural number J(n) may differ from a reference pattern to another. At any rate, the dynamic programming algorithm processor 32 specifies various combinations (n, i, j) in this manner. Inasmuch as the first through the N-th reference patterns B(1) to B(N) are separately used, it is now unnecessary as regards the signal time axis j that the J(n−1)-th reference time instant of the (n−1)-th reference pattern B(n−1) should be spaced apart from the first reference time instant of the n-th reference pattern B(n) by the reference time interval.

Supplied with the combinations (n, i, j), the coefficient processor 31 reads the feature vectors $\vec{a}(i)$ from the input pattern buffer 26 and the intermediate and the output weighting coefficients u and v from the coefficient memory 27 and calculates the dependent variables r(n, i, j) in accordance with Equation (6). As soon as calculated, each dependent variable is sent to the dynamic programming algorithm processor 32. It is now understood that a combination of the coefficient memory 27 and the coefficient processor 31 serves as the first through the N-th neural networks B(1) to B(N) and includes the first and the second adjusting arrangements 11 and 12 described in connection with FIG. 2.

Using the work area 29 and the dependent variables r(n, i, j) with the reference time signal made to indicate a cycle of the first through the J(n)-th reference time instants while the word identifier signal is kept to represent the n-th word identifier n, the dynamic programming algorithm processor 72 executes the dynamic programming algorithm. It will be assumed that Equation (2) is used as the mapping function and that the predetermined number is equal to three. Under the circumstances, the following equation is used as the recurrence or iterative formula known in the techniques of dynamic programming:

$$g(n, i, j) = r(n, i, j) + \max \begin{bmatrix} g(n, i-1, j) \\ g(n, i-1, j-1) \\ g(n, i-1, j-2) \end{bmatrix}. \quad (9)$$

Whenever the pattern time instant is increased by one, minus infinity is set in the T table as a secondary initial condition at an address T(i). Whenever the word identifier n increases one by one within one cycle of the first through the N-th word identifiers while the pattern time signal is maintained to indicate the i-th pattern time instant, tertiary initial conditions are set in the "g" and the "m" tables as follows:

g(n, i−1, −1) = *minus infinity*, g(n, i−1, 0) = T(i−1), and m(n, i−1, 0) = i−1, where minus 1 is assumed as the reference time instant j for use in an argument of maximization g(n, i−1, j−2) of Equation (9) when the reference time signal indicates 1. Similarly, a zero address is assumed for the reference time instant j in each of the "g" and the "m" tables.

For each reference time instant j, Equation (9) is calculated. According as which of three arguments of maximization g(n, i−1, j), g(n, i−1, j−1), and g(n, i−1, j−2) is maximum, one of three space points (n, i−1, j), (n, i−1, j−1), and (n, i−1, j−2) is stored in the "m" table at an address m(n, i, j) as a previous space point.

It will be assumed that the reference time signal indicates the natural number J(n) for the n-th word identifier n while the pattern time signal indicates the i-th pattern time instant. The "g" table is loaded with a point result g(n, i, J(n)), which the dynamic programming algorithm processor 32 compares with the content of the T table address T(i). If the point result is smaller, the address T(i) is untouched. If the point result is not smaller, the point result is set in the address T(i).

The pattern time signal indicates an ending pattern time instant i(e) in due course, when a T table address T(i(e)) is loaded with an area result representative of a maximum similarity measure between a reference pattern B(n̂) for an optimum word identifier n̂ and an input pattern part between a starting pattern time instant i(s) and the ending pattern time instant i(e) of the input pattern A. The optimum word identifier n̂ is set in an N table address N(i(e)). With reference to the "m" table, the starting pattern time instant i(s) is set in an M table address M(i(e)). It is unnecessary to know actual values of the ending and the starting pattern time instants.

The decision unit 33 is put into operation of referring to the N and the M tables after the pattern time signal eventually indicates the I-th pattern time instant. A local time signal is used to indicate the I-th pattern time instant at first as an "ultimate" local time instant. The optimum word identifier n̂ is read from an address N(I) of the N table. A penultimate local time instant is read from an address M(I) of the M table. The penultimate local time instant is used in accessing the N and the M tables. In this manner, a concatenation of optimum word identifiers n̂ is determined in a reversed order when the first pattern time instant is ultimately indicated by the local time signal.

It will now be assumed that Equation (8) is used as the mapping function for each word identifier and that the predetermined number is equal to three. Another equation:

$$g(n, i, j) = r(n, i, j) + \max \begin{bmatrix} g(n, i, & j-1) \\ g(n, i-1, j-1) \\ g(n, i-2, j-1) \end{bmatrix}, \quad (10)$$

is used as the recurrence formula instead of Equation (9). The previous space point is one of space points (n, i, j−1), (n, i−1, j−1), and (n, i−2, j−1). In other respects, operation is similar to that described above. It is now understood that the dynamic programming algorithm processor 32 is operable to determine the optimum locus (ñ(i), ĵ(i)) by the dynamic programming algorithm in which use is made of either Equation (9) or (10) or any other more complicated recurrence formula. At any rate, the word identifier is varied from the first word identifier to the N-th word identifier during the time interval in which the pattern time signal indicates each of the first through the I-th pattern time instants. It will readily be understood that this is equivalent to variation of the pattern time instant i from the first pattern time instant to the I-th pattern time instant for each word identifier.

In the manner so far described, the optimum locus alone is determined according to the dynamic programming algorithm without locating other various loci. It is therefore possible depending on the circumstances to designate the optimum locus simply by (n(i), j(i)).

If the connected words are spoken in compliance with a regular grammar, use of a finite-state automaton is preferred in putting the dynamic programming algorithm processor 32 into operation. It this event, the work area 29 should further comprise an automaton memory of the type described in the above-mentioned U.S. Pat. No. 4,555,796. Such an automaton memory is illustrated in FIG. 3 by a dashed-line rectangle labelled α. Being clear from comparison of U.S. Pat. No. 4,555,796 with the Watari et al patent referred to before, use of the finite-state automaton will not herein be further described. In any event, it should be understood that use of the finite-state automaton in the connected word recognition system is represented in the drawing by the automaton memory α.

While this invention has thus far been described in specific conjunction with only a few preferred embodiments thereof, it will now be readily possible for one skilled in the art to put this invention into effect in various other manners. For example, one or more of the first through the N-th neural networks B(1) to B(N) may comprise a plurality of output neuron units in each output layer. Preferably, like phonemes or like phoneme combinations should be assigned to the respective output neuron units of each output layer.

What is claimed is:

1. A speech recognition system for recognizing, as a concatenation of selected ones of first through N-th reference words, an input pattern representing connected words and having a pattern time axis defining first through I-th pattern time instants, where N represents a predetermined natural number and I represents a positive integer dependent on said input pattern, said speech recognition system comprising:

first through N-th neural networks representing said first through said N-th reference words and having first through N-th reference time axes, respectively;

supply means for supplying said input pattern to said first through said N-th neural networks in compliance with a mapping function mapping each of said first through said N-th reference time axes and said pattern time axis onto each other to make said first through said N-th neural networks produce first through N-th output signals, respectively, said first through said N-th output signals depending on said mapping function and on a plurality of relation functions each of which relates each of said first through said N-th reference words to a portion defined in said input pattern by a plurality of consecutive ones of said first through said I-th pattern time instants; and determining means for determining said selected ones of first through N-th reference words based on optimum ones of said relation functions that maximize summations of said first through said N-th output signals.

2. A speech recognition system as claimed in claim 1, wherein said mapping function defines for said i-th pattern time instant one of a predetermined number of consecutive ones of said first through said J-th signal time instants.

3. A speech recognition system as claimed in claim 2, said predetermined number being equal to three, wherein said mapping function defines for said i-th pattern time instant one of the j-th, the (j−1)-th, and the (j−2)-th signal time instants.

4. A speech recognition system as claimed in claim 1, wherein said mapping function is an inverse function which defines for said j-th signal time instant one of a predetermined number of consecutive ones of said first through said I-th pattern time instants.

5. A speech recognition system as claimed in claim 4, said predetermined number being equal to three, wherein said mapping function defines for said j-th signal time instant one of the i-th, the (i−1)-th, and the (i−2)-th pattern time instants.

6. A speech recognition system as claimed in claim 1, further comprising finite-state automation means for controlling said relation function.

7. A speech recognition system as claimed in claim 1, further comprising means for controlling said relation function by a dynamic programming algorithm.

8. A speech recognition system as claimed in claim 7, wherein said first through said N-th neural networks are collectively implemented by a combination of a coefficient memory and a coefficient processor, said coefficient processor being for receiving said input pattern, said means for controlling comprising a combination of a work area and a dynamic programming algorithm processor, said dynamic programming algorithm processor being connected to said coefficient processor to carry out said dynamic programming algorithm by using said work area.

9. A speech recognition system as claimed in claim 1, wherein each of said first through said N-th neural networks comprises:

a first plurality of input neuron units grouped into first through J-th input frames, where J represents an integer representative of a longest one of said first through said N-th reference time axes, the input neuron units of each of said first through said J-th input frames being equal in number to a first predetermined integer;

a second plurality of intermediate neuron units grouped into first through J-th intermediate frames, the intermediate neuron units of each of said first through said J-th intermediate frames being equal in number to a second predetermined integer less than said first predetermined integer and connected to the input neuron units of at least one of said first through said J-th input frames, said intermediate neuron units of some of said intermediate frames being connected to said input neuron units of at least two consecutive ones of said first through said J-th input frames; and an output neuron unit connected to the intermediate neuron units of said first through said J-th intermediate frames;

said supply means supplying said input pattern in compliance with said mapping function to the input neuron units of the first through the J-th input frames of said first through said N-th neural networks to make the output neuron units of said first through said N-th neural networks produce said first through said N-th output signals, respectively.

10. A speech recognition method using first through N-th neural networks, representing first through N-th reference words and having first through N-th reference time axes, respectively, where N represents a predetermined natural number, to recognize as a concatenation of selected ones of said first through said N-th reference words an input pattern representing connected words and having a pattern time axis defining first through I-th pattern time instants, where I represents a positive integer dependent on said input pattern, said speech recognition method comprising the steps of:

supplying said input pattern to said first through said N-th neural networks in compliance with a mapping function mapping each of said first through said N-th reference time axes and said pattern time axis onto each other to make said first through said N-th neural networks produce first through N-th output signals, respectively, said first through said N-th output signals depending on said mapping function and on a plurality of relation functions each of which relates each of said first through said N-th reference words to a portion defined in said input pattern by a plurality of consecutive ones of said first through said I-th pattern time instants; and determining said selected ones of first through N-th reference words based on optimum ones of said relation functions that maximize summations of said first through said N-th output signals.

11. A speech recognition method as claimed in claim 10, wherein each of said first through said N-th neural networks comprises:

a first plurality of input neuron units grouped into first through J-th input frames, where J represents an integer representative of a longest one of said first through said N-th reference time axes, the input neuron units of each of said first through said J-th input frames being equal in number to a first predetermined integer;

a second plurality of intermediate neuron units grouped into first through J-th intermediate frames, the intermediate neuron units of each of said first through said J-th intermediate frames being equal in number to a second predetermined integer less than said first predetermined integer and connected to the input neuron units of at least one of said first through said J-th input frames, said intermediate neuron units of some of said intermediate frames being connected to said input neuron units of at least two consecutive ones of said first through said J-th input frames; and an output neuron unit connected to the intermediate neuron units of said first through said J-th intermediate frames;

said supplying step supplying said input pattern in compliance with said mapping function to the input neuron units of the first through the J-th input frames of said first through said N-th neural networks to make the output neuron units of said first through said N-th neural networks produce said first through said N-th output signals, respectively.

12. A speech recognition method as claimed in claim 11, wherein each of said first through said N-th reference time axes define first through $J(n)$-th signal time instants, where $J(n)$ represents an integer dependent on said each of first through said N-th reference time axes, and wherein said mapping function defines for each of said first through said I-th pattern time instants and for said each of first through N-th reference time axes each of a predetermined plurality of consecutive ones of said first through said $J(n)$-th signal time instants.

13. A speech recognition method as claimed in claim 12, wherein said predetermined plurality is equal to three, and wherein said mapping function defines for said each of first through I-th pattern time instants and for said each of first through N-th reference time axes each of j-th, (j31 1)-th, and (j−2)-th signal time instants, where j is variable between 1 and $J(n)$, both inclusive.

14. A speech recognition method as claimed in claim 11, wherein each of said first through said N-th reference time axes define first through $J(n)$-th signal time instants, where $J(n)$ represents an integer dependent on said each of first through N-th reference time axes, and wherein said mapping function defines for each of said first through said $J(n)$-th reference time instants each of a predetermined plurality of consecutive ones of said first through said I-th pattern time instants.

15. A speech recognition method as claimed in claim 14, wherein said predetermined plurality is equal to three, and wherein said mapping function defines for said each of first through J-th signal time instants and for said each of first through N-th reference time axes each of i-th, (i31 1)-th, and (i−2)-th pattern time instants, where i is variable between 1 and I, both inclusive.

* * * * *

UNITED STATES PATENT AND TRADEMARK OFFICE
CERTIFICATE OF CORRECTION

PATENT NO. : 5,410,635
DATED : April 25, 1995
INVENTOR(S) : Hiroaki SAKOE

It is certified that error appears in the above-indentified patent and that said Letters Patent is hereby corrected as shown below:

Column 6, line 49, delete "15".
Column 7, line 47, delete "15".
Column 8, line 45, delete "t" and insert --i--.
Column 9, line 24, delete "(a-1)" and insert --(i-1)--.
Column 10, line 13, delete "(n,j,l)" and insert --(n,j,1)--.
Column 10, line 37, delete "+·" and insert -- + --.
Column 10, line 65, delete "anti" and insert --and--.
Column 13, line 62, delete "72" and insert --32--.
Column 18, line 41, delete "(j31 1)" and insert --(j-1)--.
Column 18, line 57, delete "(i31 1)" and insert --(i-1)--.

Signed and Sealed this

Eighth Day of October, 1996

Attest:

BRUCE LEHMAN

*Attesting Officer*     *Commissioner of Patents and Trademarks*